Patented Nov. 4, 1930

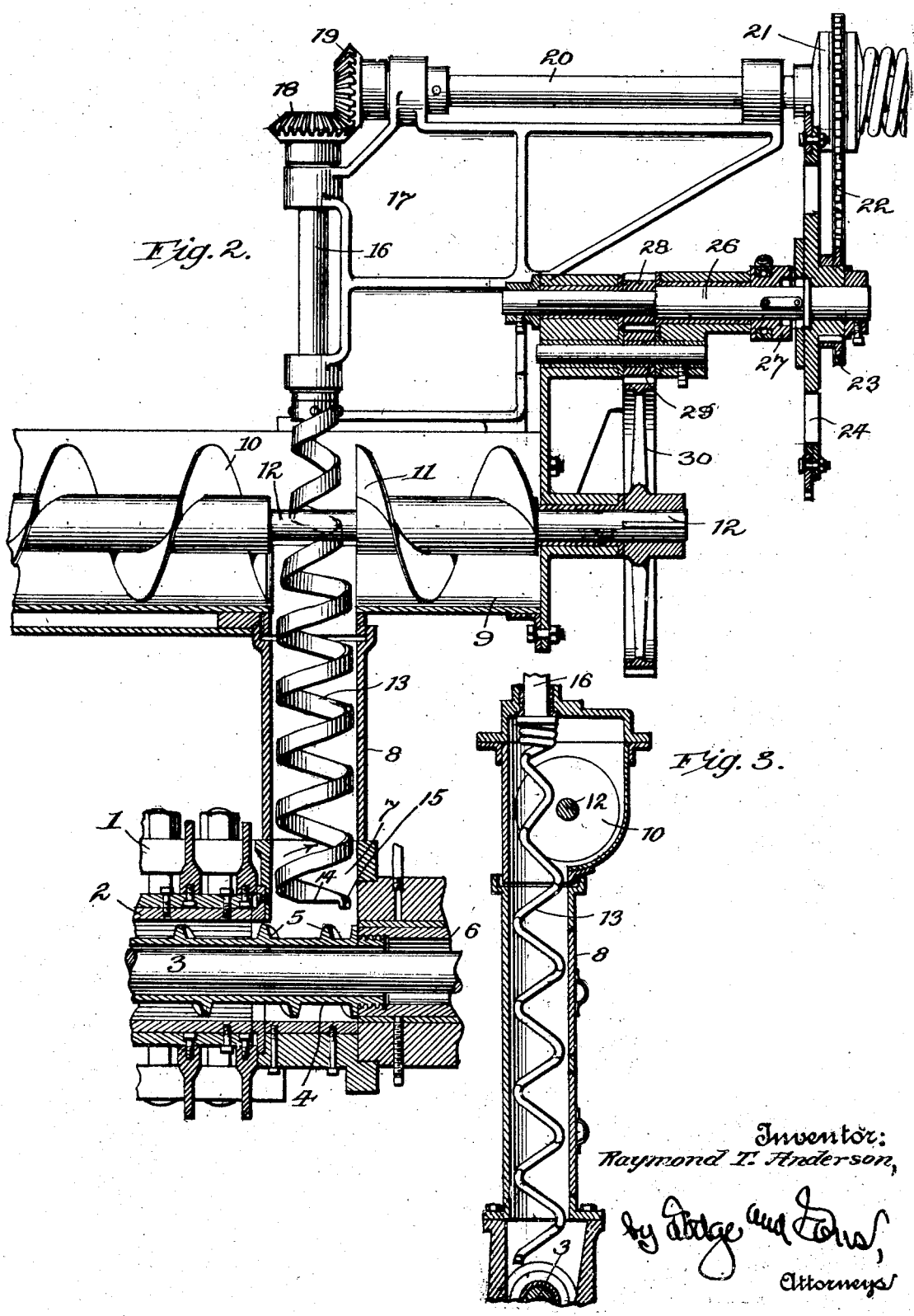

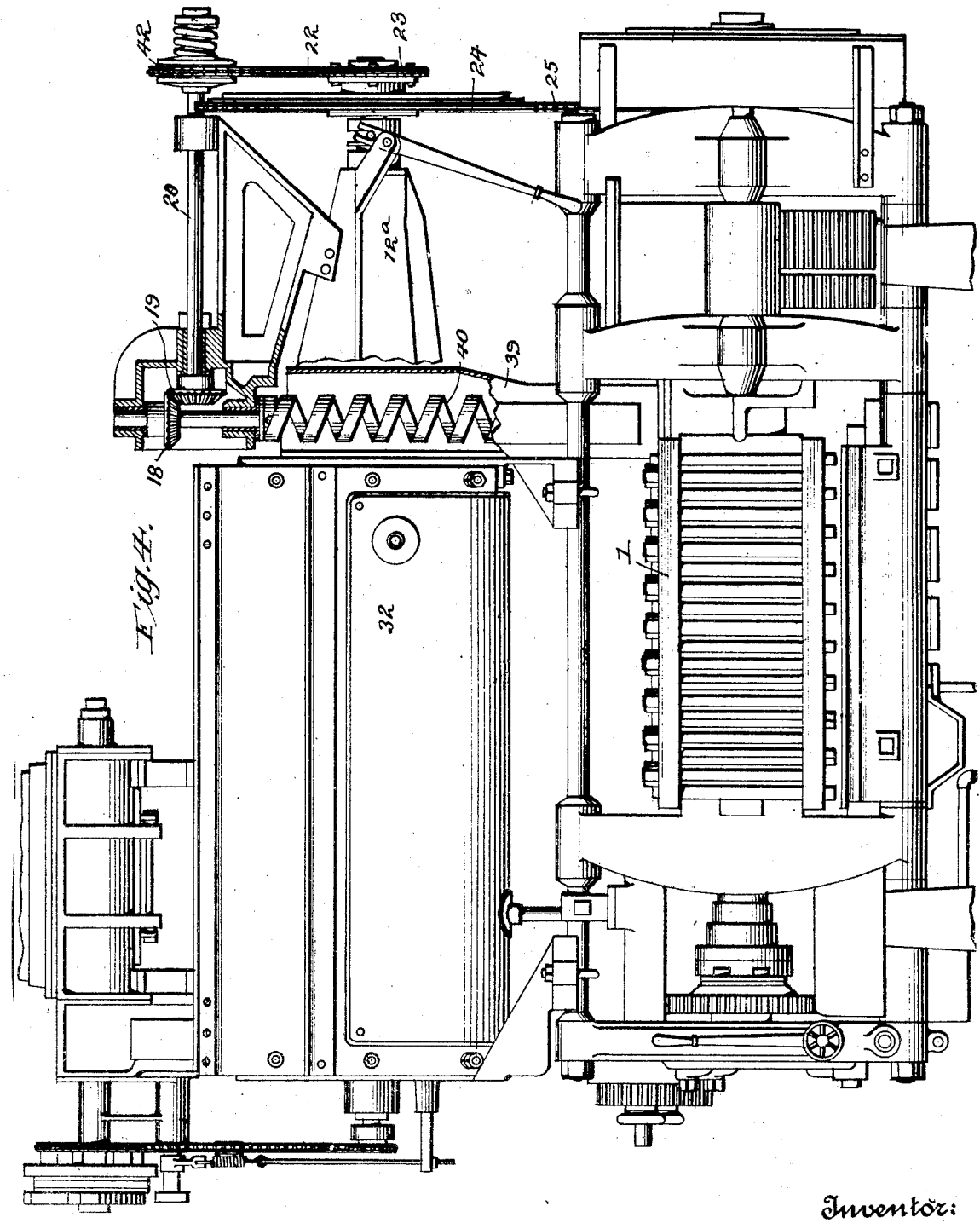

1,780,218

UNITED STATES PATENT OFFICE

RAYMOND T. ANDERSON, OF CLEVELAND, OHIO, ASSIGNOR TO THE V. D. ANDERSON COMPANY, OF CLEVELAND, OHIO, A CORPORATION OF OHIO

FEEDING MECHANISM FOR PRESSES

Application filed June 28, 1926. Serial No. 119,183.

This invention pertains to presses and more particularly to presses of that type wherein a series of spaced worms or screws are mounted for rotation within a suitable shell or casing. Such a press is shown in Letters Patent to Anderson No. 731,737, dated June 23, 1903.

The main object of the present invention is to provide an improved means for feeding the material to be pressed to the intake of the press, whereby the press will be caused to operate with greater uniformity and with an increased output.

The material to be treated is usually fed to the press by means of a hopper and with certain substances such as finely ground copra, cocoa beans and the like, the spiral stirrer or feeding device which I employ keeps oily particles from collecting on the walls of the hopper which otherwise will sometimes block the hopper causing stoppage of feed of material to the worms or screws.

When feeding coarser materials such as meat scraps, bones, offal, or substances containing pieces half inch square or larger, the spiral feeding device forces these irregular pieces down into the feeding worm of the press causing the same to take a full charge between flights instead of a small charge, or no charge at all due to a piece or pieces becoming wedged over the feeding worm.

Figure 1:
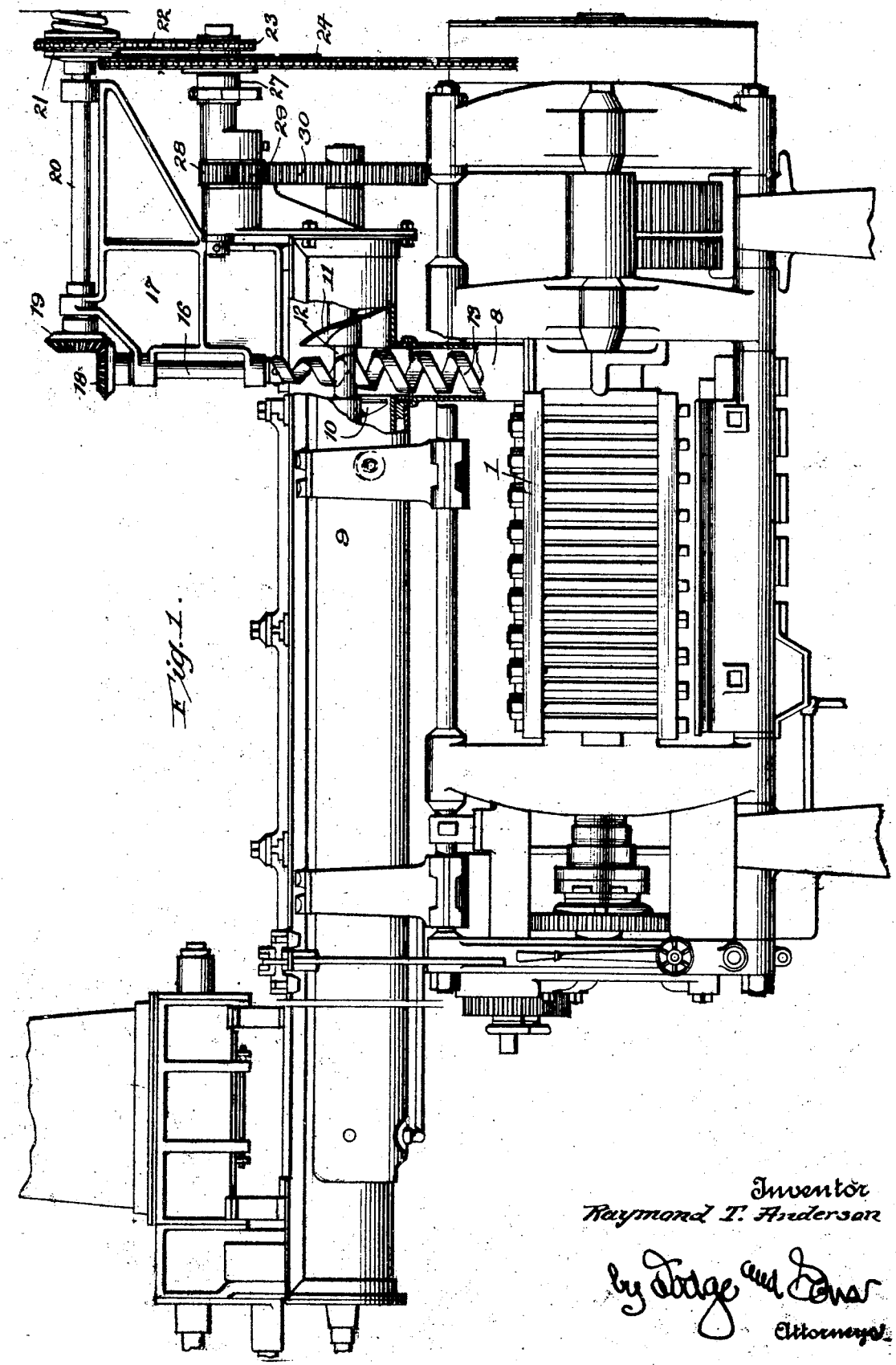
Figure 5:
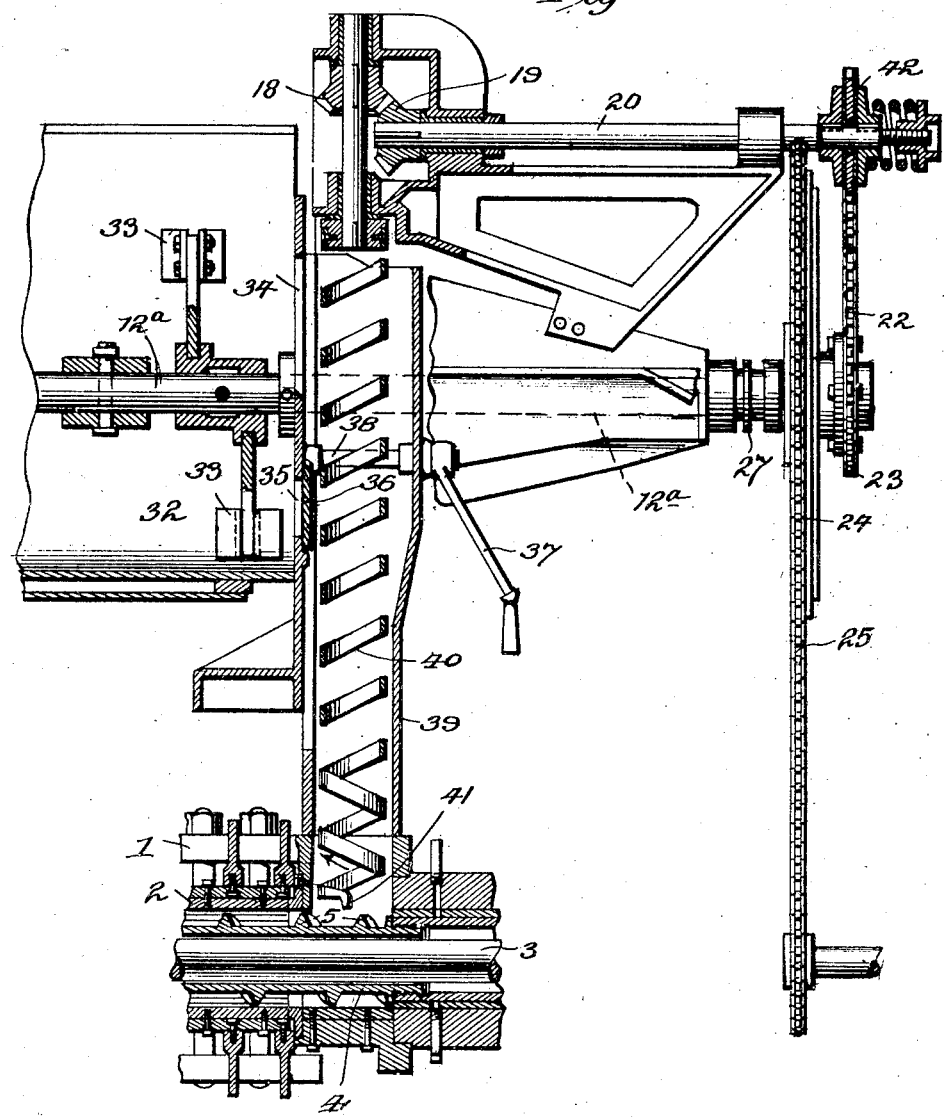

Several embodiments of my invention are illustrated in the annexed drawings wherein:

Figure 1 is a side elevation, partly in section, of a type as above noted and with which a tempering trough for the material to be treated is shown, Figure 2 an enlarged vertical sectional view of the feeding mechanism and its associated parts, Figure 3 a similar view illustrating a modified form of spiral, Figure 4 a view similar to Figure 1 showing a still further form of spiral feeder, a feed controller, associated with a tempering apparatus of a slightly different type, and Figure 5 a detail vertical section of such spiral feeder and associated parts.

Having reference first to Figures 1 and 2, 1 denotes generally, a press, the shell or body 2 whereof, Figure 2, is as in the patent above mentioned, composed of a series of spaced bars arranged in circular series and through which extends a shaft 3 which carries the pressing worms (not shown).

Surrounding the forward end of the shaft is a sleeve or quill 4 carrying a feed worm 5, said quill being rotatably driven from a driven element 6. A hopper 7 is located at the intake end of the press and a spout 8 extends upwardly therefrom and opens into the lower side of the tempering trough 9 within which is located feed screws 10 and 11. Said screws are mounted upon a common drive shaft 12 and are separated from each other at the opening leading to spout 8.

So far the structure is substantially as usual in the Anderson press.

Extending downwardly through the trough 9, spout 8, and into the mouth of the hopper 7 is a spirally formed agitator or feed regulator designated by 13.

Said member is produced from tempered spring steel bar stock preferably rectangular in cross section. Throughout that portion of its length within spout 8 the convolutions are of the same diameter, while above, the convolutions are contracted so that the same will pass to one side of the shaft 12 free of contact therewith. The lower end of the bar is tapered or scarfed as at 14 and the extreme end is turned downwardly forming a finger 15. The upper end of the spiral member is secured to the lower end of a shaft 16 mounted in suitable supporting frame or bracket 17. Rotary motion is imparted to the shaft and spiral member 13 through gears 18 and 19, the latter being secured to a shaft 20. Said shaft, at its outer end, carries a friction clutch designated by 21, one element whereof is a sprocket wheel about which passes a sprocket chain 22, said chain likewise passing about a second sprocket 23 keyed to the hub of a large sprocket 24. This latter sprocket is driven by a chain 25 (Fig. 4) which derives its motion from any suitable power source. Sprocket 24 is mounted for rotation upon the outer end of a shaft 26 but may be connected for rotation therewith through a shiftable clutch 27 under the control of the operator. Shaft 26 in turn has secured to it pinion 28 which meshes with an idler pinion 29, the latter meshing with a gear wheel 30 secured to shaft 12. Thus, when clutch 27 is in engagement, the spiral feed regulator 13 and the feed worms 10 and 11 of the tempering apparatus will be driven through sprocket wheel 24, the feed regulator and controller being driven through a connection, the friction clutch 21, which will allow it to slow up or come to rest while the other parts continue to move.

The spiral 13 may be said to be suspended within the feed spout and in action prevents smaller particles of oily matter from collecting and building up on the sides of the spout and within the mouth of the hopper 7.

When coarse material is being fed the spiral forces the large, irregular shaped pieces down into the feeding worm 5 causing the latter to take a full charge between flights instead of a small charge or no charge at all due to the material becoming wedged or bridged over the feeding worm when the feeder is not present.

I have found it necessary to drive the feed regulator or controller through a friction element so that when too much material of a coarse nature is fed to the expeller the spiral can slow up or stop until the press has taken in the material already presented to the feed worm.

The spiral being made from spring material will be placed under compression as the material builds up under it on top of the feeding worm. This compression goes to the point where the friction clutch 21 slips, at which time the feeder comes to rest. It so remains until the material below is sufficiently cleared away by the feed screw, the spiral however, owing to its compression, tending to force the material downwardly.

With fine material the spiral being open allows the particles to slip up into its center when too much material is fed into the expeller.

The parts are so proportioned and arranged that the spiral feed regulator advances the material approximately the same number of feet per minute as the feed worm, that is, its pitch and R. P. M. taken together equal those of the feeding worm in the expeller hopper.

In Figure 3 a slightly modified form of the feed regulator and controller is shown. In this instance the spiral is formed from tempered round spring wire, otherwise the construction is the same as that above described.

In Figures 4 and 5 a still further modification is shown. In this instance the press parts are lettered the same as in Figures 1 and 2 but the tempering apparatus takes a slightly different form and is somewhat larger. It may be said to comprise a tank 32 through which extends a shaft 12ª corresponding to the shaft 12 of the previously described arrangement. This shaft carries paddles 33 which tend to agitate the material placed therein. The tank 32 is provided at its right hand end with two openings designated at 34 and 35, respectively, the latter, under usual conditions, being closed by a door 36 movable to open or closed position through a hand lever 37 secured to a shaft 38 to which the door is attached. The openings 34 and 35 are in direct communication with a spout 39, the lower end of which discharges into the press hopper 7. The agitator 40 in this arrangement takes the form of a spiral and, as is the case with the construction shown in Figures 1 and 2, is produced from bar stock of tempered steel spring. The lower end is provided with a finger 41. By reason of the fact that the shaft 12ª passes outside of the chute 39 the convolutions of the coil may be of the same diameter or dimensions throughout. As in the other construction, the feeding device is driven through suitable mechanism which also drives the shaft 12ª, a friction clutch 42 being interposed between the main driving elements and the connection to the feeding spiral 40.

While in the foregoing description I have referred to the spiral members working in the chutes as being made of spring metal, it is not essential that they be produced from such material and the invention is therefore not to be limited to the use of such material.

It is also evident from an inspection of the drawings that the chute may take any desired form in cross section—thus in Figure 3 it is shown as circular whereas in the other figures it is polygonal or, more specifically, square in cross section.

What is claimed is:

1. In a press, the combination of a shell; means located therein for effecting pressure upon material to be pressed; a feed inlet; a chute in communication therewith; a spiral element formed from spring material located within the chute; and means for rotating said element.

2. In combination with a press having a feed inlet; at least one feed worm located below the inlet acting to feed the material to the press; a chute communicating with the feed inlet; a spiral member located within and extending through the chute, said member being formed from spring material; and means for rotating said member about its axis.

3. In combination with a press having a feed inlet; at least one feed worm located below the inlet acting to feed the material forwardly into the press; a chute communicating with the feed inlet; a spiral member located within and extending through the chute, said member being formed from spring material; and means for rotating said member about its axis, said means including a frictional driving element adapted, when undue pressure is exerted upon the spiral member, to allow the same to come to rest.

4. In combination with a press having a feed inlet; a tempering apparatus associated with the press; a chute extending from the tempering apparatus to the feed inlet of the press; means located below the feed inlet serving to feed the material forwardly therefrom into the press; a spiral member extending through the chute, said member being formed of spring material; and means for rotating said member about its axis.

5. In combination with a press having a feed inlet; a tempering apparatus associated with the press; a chute extending from the tempering apparatus to the feed inlet of the press; means located below the feed inlet serving to feed the material forwardly therefrom into the press; a spiral member extending through the chute, said member being formed of spring material; and means including a friction driving element for rotating said spiral member about its axis.

6. In combination with a press having a feed inlet; a chute in communication therewith; a spiral element formed from spring material located within the chute, the lower end whereof is provided with a downwardly extending finger and means for rotating said element about its axis.

7. In combination with a press having a feed inlet; a chute in communication therewith; a spiral element formed from spring material suspended from its upper end within the chute; and means for rotating said element through power applied to its upper end.

8. In combination with a press having a feed inlet; a chute in communication therewith; a spiral element formed of spring material, the convolutions whereof are separated; and means for suspending and driving said element from its upper end.

9. In combination with a press having a feed inlet; a tempering apparatus associated with the press and having an opening in the lower portion in alignment with the feed inlet; a chute extending from the opening to the feed inlet; a shaft extending through the tempering apparatus; means carried by the shaft for agitating the material within the tempering apparatus and feeding it to the chute; a member spiral in outline and formed of spring material located within the chute and extending upwardly through the opening in the tempering apparatus, the upper portion of said member having its convolutions of a less diameter than the remainder so that it may pass the shaft without interference therewith; and means for driving said spiral member.

10. In combination with a press having a feed inlet; a chute in communication therewith; a spiral element formed from spring material, the convolutions whereof are separated; means for suspending said member within the chute, leaving the lower end thereof free; and means embodying a friction element for rotating said spiral element about its axis.

11. In combination with a press having a feed inlet; a chute in communication therewith; an open spiral element located within the chute; and means for rotating said element.

In testimony whereof I have signed my name to this specification.

RAYMOND T. ANDERSON.